(12) United States Patent
Suzuki et al.

(10) Patent No.: US 7,676,140 B2
(45) Date of Patent: Mar. 9, 2010

(54) RECORDING APPARATUS

(75) Inventors: Kazuya Suzuki, Kanagawa (JP);
Hajime Nishimura, Kanagawa (JP);
Tetsuya Tamura, Kanagawa (JP);
Takeshi Sasa, Miyagi (JP)

(73) Assignee: Sony Corporation, Tokyo (JP)

( * ) Notice: Subject to any disclaimer, the term of this patent is extended or adjusted under 35 U.S.C. 154(b) by 1002 days.

(21) Appl. No.: 11/401,711

(22) Filed: Apr. 11, 2006

(65) Prior Publication Data

US 2006/0250721 A1 Nov. 9, 2006

(30) Foreign Application Priority Data

Apr. 12, 2005 (JP) ............... 2005-114999

(51) Int. Cl.
*H04N 5/91* (2006.01)

(52) U.S. Cl. ............... 386/95; 386/65; 386/124; 386/126; 348/231.2; 725/134

(58) Field of Classification Search ............... 386/95, 386/126, 124, 65; 348/231.2; 725/134
See application file for complete search history.

(56) References Cited

U.S. PATENT DOCUMENTS

| | | | | |
|---|---|---|---|---|
| 6,148,140 A | * | 11/2000 | Okada et al. | 386/105 |
| 6,269,420 B1 | * | 7/2001 | Horie | 711/103 |
| 6,862,401 B1 | * | 3/2005 | Higashida et al. | 386/100 |
| 2003/0170008 A1 | * | 9/2003 | Ohiro et al. | 386/111 |
| 2007/0217605 A1 | * | 9/2007 | Sako et al. | 380/201 |

FOREIGN PATENT DOCUMENTS

| | | |
|---|---|---|
| EP | 1058256 A1 | 12/2000 |
| GB | 2361081 A | 10/2001 |

\* cited by examiner

*Primary Examiner*—Thai Tran
*Assistant Examiner*—Helen Shibru
(74) *Attorney, Agent, or Firm*—Robert J. Depke; Rockey, Depke & Lyons, LLC

(57) ABSTRACT

There is provided a recording apparatus which includes a recording medium having a data area with an address assigned to each cluster of a predetermined size; an interface for connection to a host apparatus; writing means for writing data in the data area; access order deciding means for dividing the data area of the recording medium into a plurality of areas each having an optional data capacity, and deciding an order of accessing the divided areas from the writing means; timing deciding means for deciding a timing when file information on written data is to be updated; control means for controlling the writing means to access a plurality of divided areas in accordance with the decided access order, search an empty cluster in the accessed area, and write data in the searched empty cluster and file information updating means for updating the file information on already written data.

5 Claims, 13 Drawing Sheets

| FAT VALUE (HEXADECIMAL NOTATION) | MEANING |
|---|---|
| 0000h | CLUSTER IS IN "EMPTY" STATE |
| 0002h~FFF6h | CLUSTER IS IN "ALREADY ASSIGNED" STATE HAVING CONTINUING DATA |
| FFF7h | CLUSTER IS "DEFECT CLUSTER" |
| FFF8h~FFFFh | CLUSTER IS IN "ALREADY ASSIGNED" STATE INDICATING FILE END (EOF) |

FIG.3

| ZONE | START TRACK | END TRACK | NUMBER OF TRACKS | NUMBER OF SECTORS | TOTAL NUMBER OF SECTORS |
|---|---|---|---|---|---|
| 0 | 0 | 1023 | 1024 | 266 | 272384 |
| 1 | 1024 | 1919 | 896 | 266 | 238336 |
| 2 | 1920 | 3327 | 1408 | 256 | 360448 |
| 3 | 3328 | 4479 | 1152 | 240 | 276480 |
| 4 | 4480 | 5503 | 1024 | 240 | 245760 |
| 5 | 5504 | 6527 | 1024 | 240 | 245760 |
| 6 | 6528 | 7551 | 1024 | 224 | 229376 |
| 7 | 7552 | 8447 | 896 | 224 | 200704 |
| 8 | 8448 | 9727 | 1280 | 213 | 272640 |
| 9 | 9728 | 11391 | 1664 | 200 | 332800 |
| 10 | 11392 | 12799 | 1408 | 192 | 270336 |
| 11 | 12800 | 13695 | 896 | 180 | 161280 |
| 12 | 13696 | 14847 | 1152 | 160 | 184320 |
| 13 | 14848 | 16383 | 1536 | 160 | 45760 |
| 14 | 16384 | 17919 | 1536 | 160 | 245760 |
| 15 | 17920 | 19279 | 1360 | 160 | 217600 |

FIG.5

| Command | bit | 7 | 6 | 5 | 4 | 3 | 2 | 1 | 0 |
|---|---|---|---|---|---|---|---|---|---|
| | | | | Rec COMMAND CODE | | | | | |
| Features | | SC | EOF | | | | | | |
| Sector Count | | | | | Zone | | | | |
| Sector Number | | | | | na | | | | |
| Cylinder Low | | | | | na | | | | |
| Cylinder High | | | | | na | | | | |
| Device/Head | | obs | na | obs | DEV | na | | | |

FIG.11

| | bit | 7 | 6 | 5 | 4 | 3 | 2 | 1 | 0 |
|---|---|---|---|---|---|---|---|---|---|
| Status | | | | | STATUS CODE | | | | |
| Error | | | | | ERROR CODE | | | | |
| Sector Count | | | | | CLUSTER ADDRESS (0-7) | | | | |
| Sector Number | | | | | CLUSTER ADDRESS (8-15) | | | | |
| Cylinder Low | | | | | CLUSTER ADDRESS (16-23) | | | | |
| Cylinder High | | | | | CLUSTER ADDRESS (24-31) | | | | |
| Device/Head | | obs | na | obs | DEV | | na | | |

FIG.12

RECORDING APPARATUS

CROSS REFERENCES TO RELATED APPLICATIONS

The present document contains subject matter related to Japanese Patent Application JP 2005-114999 filed in the Japanese Patent Office on Apr. 12, 2005, the entire contents of which being incorporated herein by reference.

BACKGROUND OF THE INVENTION

1. Field of the Invention

The present invention relates to a recording apparatus for recording data by using a head scheduling process.

2. Description of Related Art

Storage of a large capacity such as HDD and optical discs are used nowadays as devices for recording moving images and audio data in consumer AV equipment. A PC, which accesses a large capacity storage and executes processes such as data recording, is required to increase the number of processed commands or data traffic per unit time. However, much attention has not paid to a variation in these number and amount. The data traffic is calculated as an average value in a relatively long time.

Performance (specifications) including data traffic of consumer AV equipment such as digital cameras and video cameras is not required to be much higher than that of HDD. For example, a data rate of consumer equipment is about 25 Mbit/sec even if standard MPEG2 is used for recording High Definition (HD) data, and this data rate is not so high from the viewpoint of an HDD transfer rate exceeding 10 Mbit/sec.

However, a small diameter HDD is adopted recently as recording media of compact portable consumer AV equipment such as video cameras and digital cameras. Generally, this small diameter HDD has a lower data transfer rate than those of HDD having a disk diameter of 3.5 inches and HDD having a disk diameter of 2.5 inches, and can not meet sufficiently the requirements of high image quality recording. Further, in HDD, since the transfer rate drops (is lowered) generally in a disk inner circumferential area more than in a disk outer circumferential area. For example, problems may occur in some cases, such as stoppage of images and audio data during playing back data and inability of recording images during data recording. These problems are serious about using consumer AV equipment employing HDD as a storage. Furthermore, the transfer rate of consumer AV equipment is lower further because of a retry process and the like to be executed due to a seek error of a head mounted on HDD or an error in read data.

The first problem of a lowered data transfer rate can be avoided by setting consumer AV equipment to neglect errors of AV data and the like allowed to have low data reliability, by setting an upper limit of a command process time, or the like. For example, in Streaming Feature Set, AV command of ATA-7, a process time of each command can be designated directly.

However, how a designated command is executed relies completely upon a storage, typically HDD, so that it cannot guarantee whether data is correctly written/read in/from the disk. An occurrence frequency of the problem of this type is very low in practical usage.

The second problem such as a seek error has a higher occurrence frequency than that of the first problem and is more serious. As a solution method for this problem, a process of devising a physical layout of files has been proposed, and many researches have been conducted.

For example, in a proposed file system, a device of disposing related data at physically nearby positions is realized in a logical block address (LBA) space by utilizing data locality. As a file physical layout method, a method (hereinafter called a head scheduling process) has been proposed, as in FIG. 13, by which a low transfer rate area and a high transfer rate area are used in combination although a seek operation is performed frequently in order to guarantee a minimum seek time.

The recent spread of PCs and digital cameras makes it general to edit images taken with imaging apparatus. If a magnetic tape is used as media for storing photographed data, it takes very long time to read data from the magnetic tape, to transfer the read data to PC and to search desired images. This problem results in an inferior quick response. It is thus desired to use HDD as media of imaging apparatus, because HDD has an excellent quick response and fair advantages in terms of data transfer rate and random access.

Data recorded in HDD is managed by using a file system such as a FAT, and it becomes necessary to record file management information including directory information, FAT information to be used for data reading in addition to a write operation of photographed data itself. For example, in a case of a FAT file system as a general file system, file management information is recorded in a predetermined area of HDD before a recording operation for photographed data and after the recording operation. If file management information is not written, data reading is impossible.

Imaging apparatus such as a video camera is a system for recording long-time photographed data. If HDD is used with the apparatus of this type and a power shutdown of the apparatus occurs, for example, by dropping the apparatus during photographing (recording) an object, the file management information cannot be written, so that all data photographed up to that time is lost.

Namely, if the file management information is not recorded because of the power shutdown, the photographed data cannot be distinguished as a file, and the recorded image file without the file management information cannot be read. In a case where a magnetic tape is used for recording, even if power shutdown of a video camera occurs during photographing, data immediately before the power shutdown can be retained.

In order to solve the above-described problems, a method has been proposed by which file management information is updated each time data is recorded. For example, refer to Japanese Patent Application Publication (KOKAI) No. 2003-30925.

SUMMARY OF THE INVENTION

However, the above-described method requires, because file management information is actually written, a seek time taken to move a head to a target sector, a disk rotation wait time, a data recording time, a seek time taken to return again to the record area after write completion of the file management information. Since these times are required each time photographed data is recorded in HDD, an effective data transfer rate lowers more than when a data protection process, in which file management information is updated each time data is recorded, is not executed, so that requirements of high image quality recording such as HD cannot be met at all.

If the file record area moves to the disk inner circumferential area from the disk outer circumferential area, a physical moving distance (seek time) to a write position of file management information for data protection becomes longer, so that the transfer rate lowers further because of this moving operation, resulting in problems such as inability of image recording during data recording. This problem also occurs when a data transfer rate is guaranteed by the head scheduling process, so that it is difficult to satisfy both a data transfer rate guarantee and file protection.

According to an embodiment of the present, there is provided a recording apparatus having an optimum combination of a head scheduling process guaranteeing a data transfer rate and a data protection method of solving a file loss problem.

In order to solve the above-described issue, a recording apparatus according to an embodiment of the present invention comprises: a recording medium; an interface unit; writing means; access order deciding means; timing deciding means; control means and file information updating means. The recording medium has a data area with an address assigned to each cluster of a predetermined size. The interface unit is for connection to a host apparatus. The writing means writes data supplied from the host apparatus via the interface unit in the data area of the recording medium. The access order deciding means divides the data area of the recording medium into a plurality of areas each having an optional data capacity, and when data is to be written, decides an order of accessing the plurality of divided areas from the writing means. The timing deciding means decides a timing when file information on written data is to be updated, in accordance with the access order decided by the access order deciding means. The control means controls the writing means, when data supplied from the host apparatus via the interface unit is to be written in the data area of the recording medium, to access a plurality of divided areas in accordance with the access order decided by the access order deciding means, to search an empty cluster in the accessed area, and to write data in the searched empty cluster. The file information updating means updates the file information on already written data in accordance with the timing decided by the timing deciding means.

According to the embodiment of the present invention, data is written by combining a head scheduling process for guaranteeing a data transfer rate during data writing and a data protection process for protecting data from a file loss to be caused by a power shutdown or the like during data writing. It is therefore possible to minimize a reduction in the data transfer rate during data writing and suppress a data amount to be deleted by the power shutdown or the like to the minimum.

BRIEF DESCRIPTION OF THE DRAWINGS

FIG. 3 is a diagram illustrating meaning of each identification information.

FIG. 5 is a diagram illustrating an example of the numbers of sectors contained in tracks of a recording medium.

FIG. 11 is a diagram showing an example of a Rec command.

FIG. 12 is a diagram showing an example of a status command.

DESCRIPTION OF THE EMBODIMENTS

An embodiment adopting the present invention will be described hereunder in detail with reference to the accompanying drawings. In the embodiment, the present invention is applied to a data transmission/reception system including a host apparatus and a data recording apparatus having at least a rotary recording medium such as a hard disk and a rewritable optical disc, and the data transmission/reception system can guarantee a data transfer rate even if there is a delay caused by a rotation wait time and a seek operation when accessing data recorded in the rotary recording medium. The data transmission/reception system of the embodiment adopts a file system for managing all data including AV data and the like, as files. In this embodiment, a data transfer time includes a moving time including a head seek operation time and a disk rotation wait time, and a data writing time taken to actually write data. A data transfer rate is obtained by dividing transfer data by the data transfer time.

In the description of this embodiment, although the data recording apparatus has a magnetic recording medium such as a hard disk, other recording medium such as an optical disc including a CD and a DVD may also be used. In addition, the embodiment describes a case where a hard disk apparatus (HDD) is adopted as the recording medium and an MS-DOS compatible FAT file system is adopted as the file system, the file system is not limited only to the MS-DOS compatible FAT file system, but any other systems may be applicable so long as the systems manage data as files.

Figure 1:
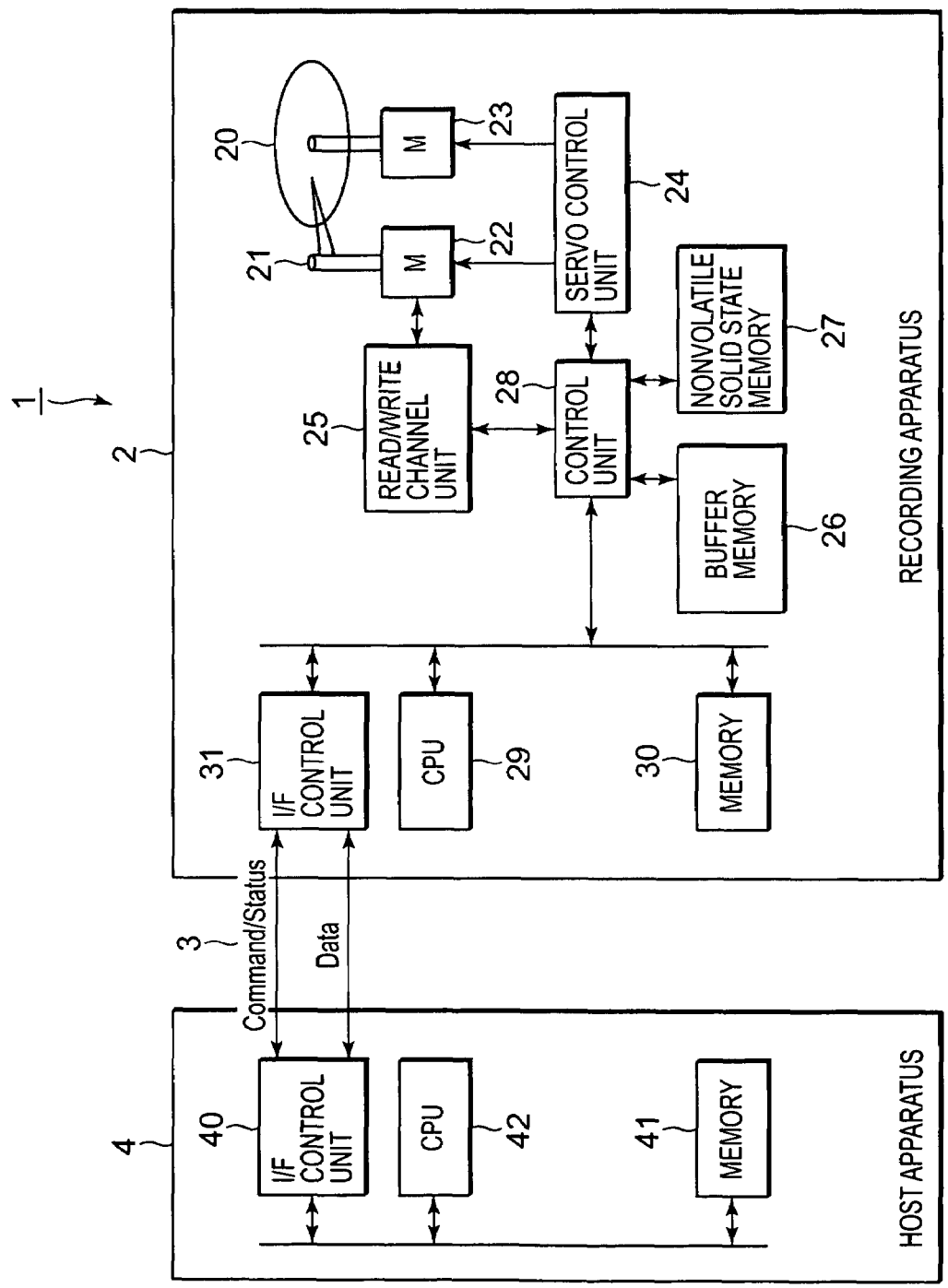
FIG. 1 is a block diagram showing a data transmission/reception system according to an embodiment of the present invention.

FIG. 1 is a block diagram showing a data transmission/reception system according to the embodiment. As shown in FIG. 1, the data transmission/reception system 1 is configured by a host apparatus 4 such as a PC and an AV apparatus and a recording apparatus 2 having a recording medium 20 in which data is to be written, respectively interconnected by an interface 3 such as Integrated Drive Electronics (IDE), Small Computer System Interface (SCSI), Fibre Channel (FC) and Universal Serial Bus (USB).

As shown in FIG. 1, the recording apparatus 2 has: a head unit 21; a head drive unit 22; a recording medium drive unit 23; a servo control unit 24; a read/write channel unit 25; a buffer memory 26; a control unit 28; a calculation unit (CPU) 29; a memory 30; and an interface control unit 31. The head unit 21 writes data in the recording medium 20 and reads the written data. The head drive unit 22 drives the head unit 21 when accessing the recording medium 20. The recording medium drive unit 23 drives the recording medium 20 in a predetermined direction at a predetermined rotation speed. The servo control unit 24 controls the head drive unit 22 and the recording medium drive unit 23. The read/write channel unit 25 executes a predetermined process for supplied data. The buffer memory 26 is for temporarily buffering data. The control unit 28 controls the read/write channel unit 25. The calculation unit (CPU) 29 performs predetermined calculations and sets necessary commands and parameters to the servo control unit 24, read/write unit 25 and the like to operate these units. The memory 30 is used for calculations and the like by the CPU 29. The interface control unit 31 is for transmission/reception of data, control information and the like to/from the host apparatus 4.

The recording medium 20 is managed by a File Allocation Table (FAT) file system to be described later, and is constituted of a disk recording medium such as a hard disk (HD) having user data areas (hereinafter called user areas UA) each assigned an address (hereinafter called a physical address) per at least a predetermined data size (cluster).

A nonvolatile solid state memory 27 may further be provided to constitute a hybrid recording apparatus collectively using the recording medium 20 and the nonvolatile solid state memory 27 as a data recording area. The nonvolatile solid state memory 27 may be used as a cache for temporarily storing data supplied from the host apparatus 4 or for storing programs to be used for apparatus activation. The nonvolatile solid state memory 27 is, for example, an NAND type flash memory card (Memory Stick (Registered Trademark), Compact Flash (Registered Trademark), SD Card (Registered Trademark), and etc.) adopting a FAT system, and has data areas assigned a series of addresses (hereinafter called memory addresses) per a predetermined data size (page).

If the recording medium 20 is a magnetic recording medium such as HD, the head unit 21 is constituted of a magnetic head having a magnetosensitive element for detecting a magnetic field signal from the recording medium 20 by utilizing so-called magnetoresistive effects of changing a resistance value in accordance with an intensity and direction of an external magnetic field.

The head drive unit 22 controls the operation of the head unit 21 under control by the servo control unit 24.

The recording medium control unit 23 controls to rotate the recording medium 20 at a predetermined rotation speed under control by the servo control unit 24.

The servo control unit 24 controls the recording medium drive unit 23 in order to rotate the recording medium 20 in a predetermined direction at the predetermined rotation speed, and controls the head unit 21 in order to access the recording medium 20 at a predetermined position.

The read/write channel unit 25 encodes (modulates) supplied data for a data write operation to convert the data into a digital bit train suitable for the characteristics of a recording/reproducing system, and supplies the converted data to the head unit 21. The read/write channel unit 25 also removes high frequency noises from a reproduction signal supplied from the head unit 21 for a data read operation and thereafter, digitalizes the reproduction signal at an analog-digital converter (ADC), and performs a predetermined process by using a maximum likelihood decoding method or the like to realize demodulation.

Under control by the control unit 28, the buffer memory 26 temporarily buffers data supplied from the host apparatus 4, at the time of data writing, reads data when a predetermined amount of data is buffered, and supplies the read data to the read/write channel unit 25. Under control by the control unit 28, the buffer memory 26 temporarily buffers data supplied from the read/write channel unit 26, at the time of data reading, reads data when a predetermined amount of data is buffered, and supplies the read data to the host apparatus 4 via the interface control unit 31. The buffer memory 26 is used for temporarily buffering data to prevent the performance from being lowered by a difference between transfer rates, for data reading/writing.

The control unit 28 has functions of access order deciding means and timing deciding means. The control unit 28 manages data transmission/reception between the buffer memory 26 and read/write channel unit 25 by the FAT file system to be described later, and executes a process regarding a data format. When this process is executed, the control unit 28 also executes a process regarding error detection and error correction by using error correction codes. The control unit 28 also executes a process of assigning a logical sector number (LSN) which determines the write order of writing data supplied from the host apparatus 4 into the recording medium 20 and the nonvolatile solid state memory 27.

The host apparatus 4 has an interface control unit 40 for data transmission/reception relative to the recording apparatus 2 via the interface 3, a CPU 42 for executing a predetermined calculation process and a memory 41 to be used for calculations and the like by the CPU 42. The host apparatus 4 is, for example, an application apparatus such as a video camera, a digital camera and a music player for efficiently executing a recording/reproducing process by positively utilizing the advantages of the recording apparatus 2.

The CPU 42 uploads each data stored in a boot area, a FAT area and a directory area to the memory 41, the data being management data stored in a system area of the recording medium 20, and transmits various commands obtained through parameter settings on the basis of the uploaded data, to the recording apparatus 4.

Figure 2:
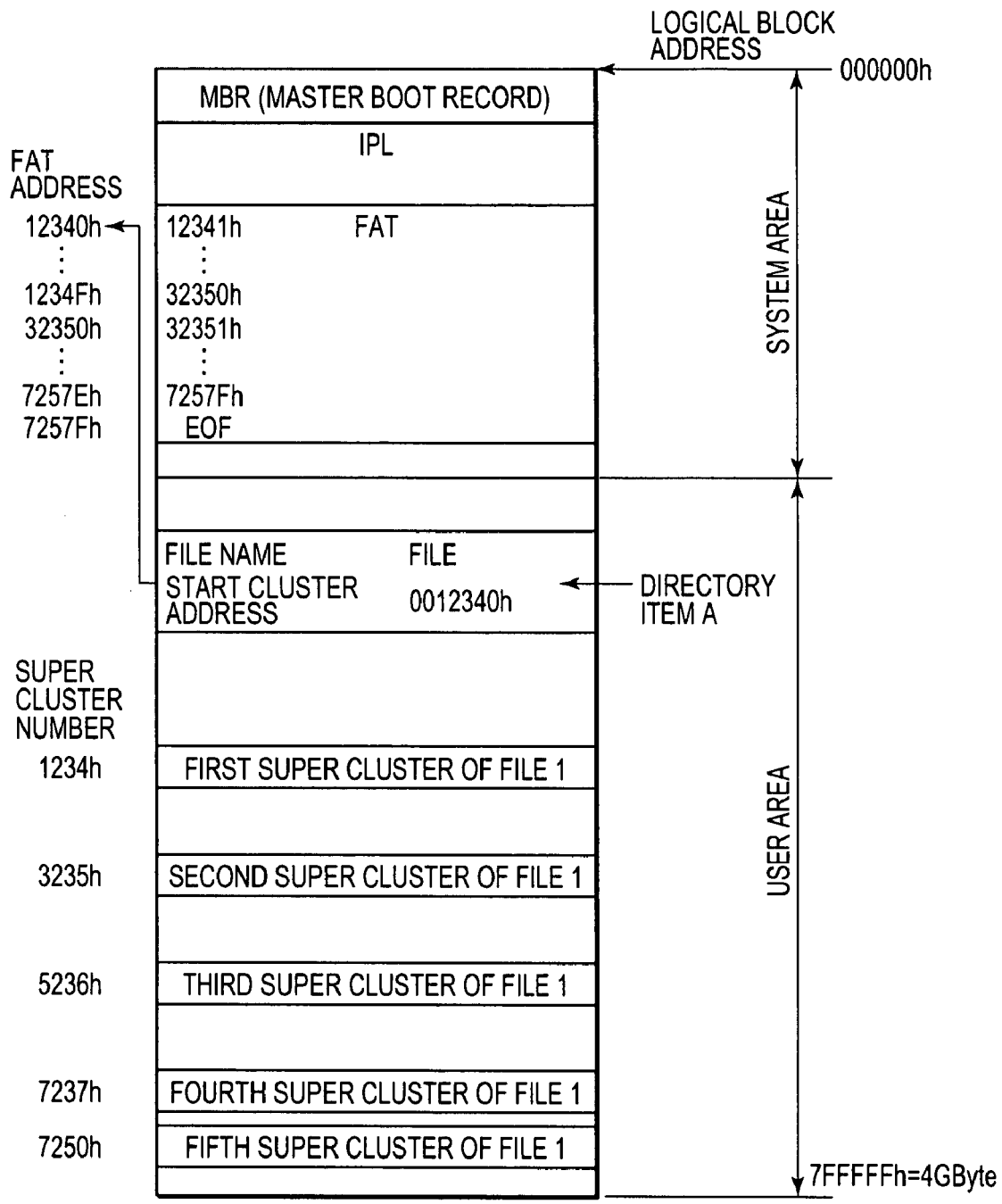
FIG. 2 is a schematic diagram showing an LBA space in an address space as viewed from a host apparatus.

Next, a data management method of the embodiment will be described. Data to be recorded in the recording medium 20 is managed in different address spaces by the host apparatus 4 and the recording apparatus 2, respectively. FIG. 2 is a diagram showing an LBA space which is an address space viewed from the host apparatus 4.

The minimum unit of data recording of the recording apparatus 2 is called a sector usually having a size of 512 bytes. The recording apparatus 2 manages the record area of the recording medium 20 on the basis of a sector unit by using three items: a physical address, a physical sector number and a logical sector number. The physical address is constituted of three items: a surface number, a track number and a sector number. The physical sector number is sequentially numbered from an outer circumferential area to an inner circumferential area of the recording medium 20. The logical sector number is an address assigned to a defective sector unable to be written/read, by a reallocation process.

The host apparatus 4 accesses the recording medium 20 by using not the logical sector number but a logical block address (LBA). The file system for managing files uses one cluster constituted of a plurality of (N) sectors as the minimum unit of reading/writing. In the following description, it is assumed that N=16 and one cluster is 8 Kbytes. Therefore, the cluster number is obtained by simply dividing LBA by N.

In this embodiment, an access size is set particularly for AV data. In the following, this size is called a super cluster. One super cluster is constituted of a plurality of clusters (an integer multiple of a cluster). In the present invention, a super cluster is set to have sixteen clusters (128 Kbytes). An address of a super cluster is one sixteenth of the cluster number, i.e., a hexadecimal representation with the last one digit being deleted.

The record area of the recording medium 20 is divided into three areas: a system area for the recording apparatus 2, a system area SA and a user area UA, and only the system area SA and the user area UA are assigned to the LBA space viewed from the host apparatus 4 as shown in FIG. 2.

The system area for the recording apparatus 2 is an area that the host apparatus 4 cannot access directly, and is an area used in a predetermined mode, in this case, AV mode.

The system area SA has an area where a master boot record (MBR) is recorded, an area where an initial program loader (IPL) which is a program necessary for a system boot, i.e., activation, is recorded and an area where FAT is recorded. The MBR is a sector having LBA of 0 as viewed from the host apparatus 4, in which bootstrap codes and a partition table are recorded.

Directory items for managing file information and actual data are written in the user area UA. In a FAT file system before FAT 32, a root directory belonged to the system area SA. Each directory item stores a file name, an extension, an attribute, a latest update time, a start cluster number, a file size and the like of each directory (file).

The FAT file system will now be described. The FAT file system is a file system adopted by an external storage of a host apparatus such as a personal computer (PC). The external storage includes, for example, a hard disk drive (HDD) and media using a nonvolatile solid state memory as a recording medium (Memory Stick (registered trademark) manufactured by Sony Corporation, SmartMedia (registered trademark) manufactured by Toshiba Corporation, CompactFlash (registered trademark) manufactured by SanDisk, Inc., multimedia card and the like).

The FAT file system is constituted of: a FAT recording link information indicating that each file is located at which position of the recording medium, and a directory item indicating a file attribute and a position in the directory, where the file exists. A file system which manages files by using FAT is called a FAT file system.

As shown in FIG. 2, the system area SA for storing FAT and a directory item A for the root directory are provided on the recording medium 20 in a dedicated manner. The host apparatus 4 receives this information necessary for file access from the recording apparatus 2 via a PC interface (Small Computer System Interface (SCSI), Integrated Drive Electronics (IDE), IEEE 1394, Universal Serial Bus (USB), etc.), and controls recording/reproducing in accordance with the received information.

For example, in a case where a file is to be written in the recording medium 20, the file is divided in a cluster size, and each divided data is written in the recording medium. The address of a cluster in which the first data is written is used as a start cluster address and written in the directory item A, and address information of each cluster in which other data is written is written in FAT. Therefore, in a case where a desired file is to be read, the directory item is referenced to find the start address of the file, and a corresponding FAT is read, so that each written data can be read in the write order. By coupling each read data, a file is completed and the file can be read.

In a case where an arbitrary file is to be deleted, FAT items corresponding to used clusters are deleted (to change to empty clusters), leaving the written data as it is.

As shown in FIG. 3, predetermined information such as empty information of the data area is indicated in FAT by identification information. For example, identification information "0000h" indicates that the corresponding cluster is in an "empty" state, identification information "0002h to FFF6h" indicates that the corresponding cluster is in an "already assigned" state, identification information "FFF7h" indicates that the corresponding cluster is a "defect cluster", and identification numbers "FFF8h to FFFFh" indicate that the corresponding cluster is a file end (EOF: End Of File) in an "already assigned" state.

Figure 4:
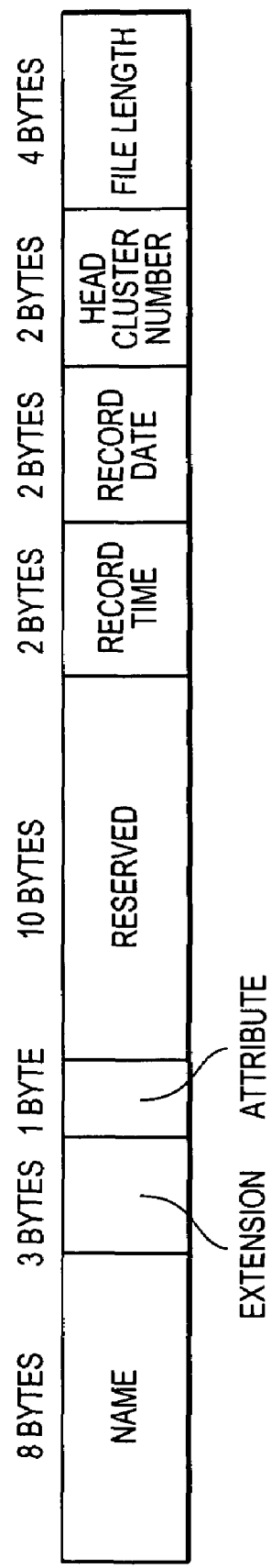
FIG. 4 is a diagram showing a structure of a directory area.

The data is constituted of a directory area for managing file information and a data recording area in which actual data is written. As shown in FIG. 4, the directory area is constituted of information on a file name, an extension, an attribute, a reserved area (RES), a record time, a record date, a top (start) cluster number (address) and a file size (file length) respectively of each directory (each file).

Next, a data write method of the embodiment will be described. First, a record area of the recording medium 20 will be described. Super clusters for data writing are disposed from the top of the user area UA without leaving any space, excepting the root directory area and the like. Tops of super clusters are therefore disposed generally at an equal pitch as viewed along a circumferential direction. The reason for this is as follows. In recent HDD, a disk is divided into a plurality of zones, e.g., 10 to 20 zones, and zone bit recording is generally performed using the same writing frequency and recording/reproducing parameters (coefficients of a waveform equalizing filter and the like) in each zone. Therefore, the numbers of sectors contained in an inner circumferential side track and an outer circumferential side track of the recording medium are different. One example, Hitachi 4 GB Micro Drive 3K-4, Hard Disk Drive Specifications is shown in FIG. 5. It is to be noted that if the number of sectors per one super cluster and the number of sectors per one track have a large greatest common divisor, tops of super clusters are disposed unevenly as viewed along the circumferential direction.

Figure 6:
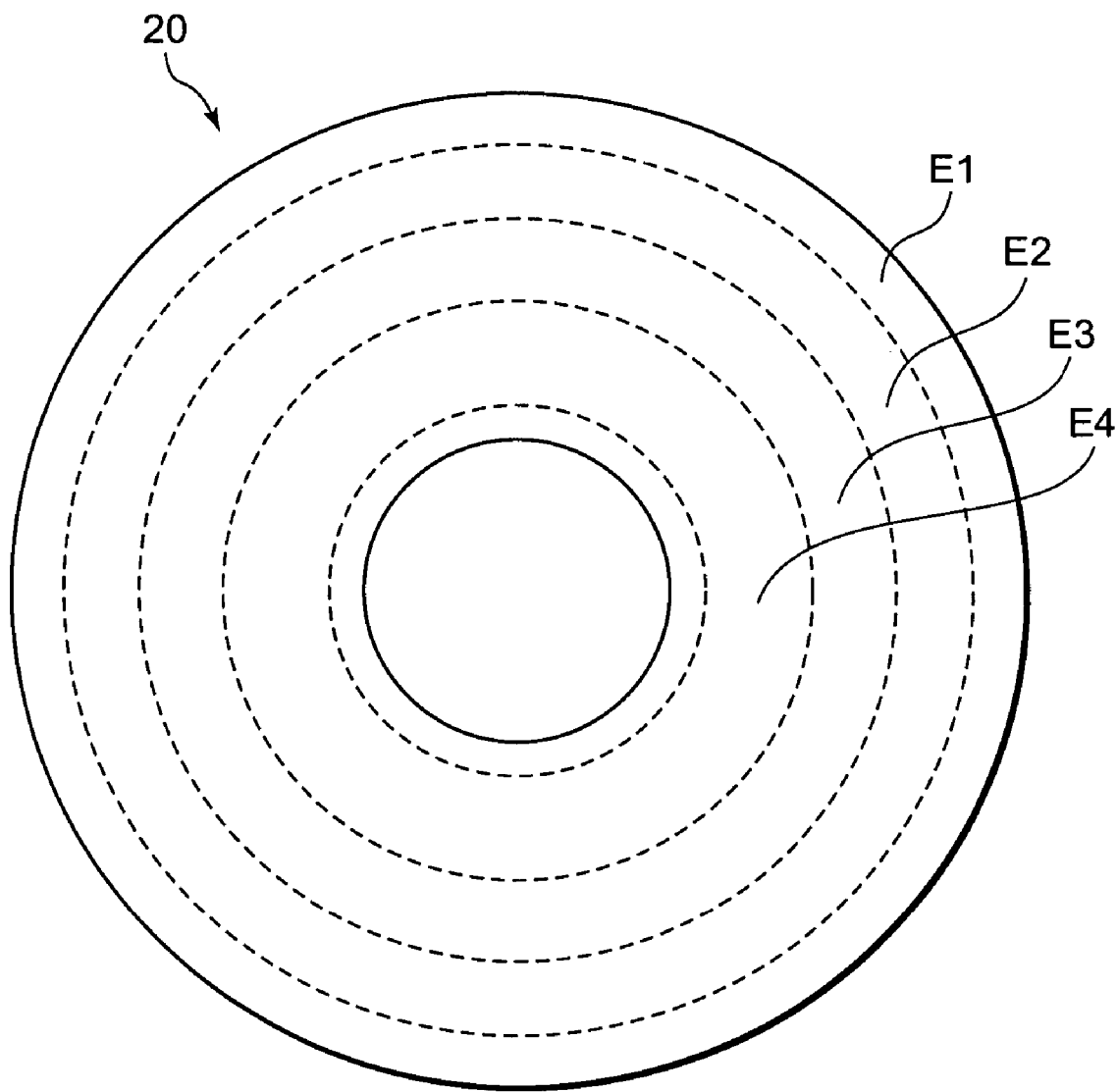
FIG. 6 is a schematic diagram showing an example of a recording area of a recording medium divided into four areas.

In this embodiment, the recording medium having super clusters disposed in this manner is further divided into areas as a plurality of partial areas each having generally the same capacity. FIG. 6 shows an example of areas having the number of areas of "4". Since each area is set to have generally the same capacity in accordance with a data continuous transfer rate, a width of each area becomes narrower toward the outer circumferential side of the recording medium. It is assumed that the total capacity of the recording medium 20 is 4 GB, each area has a capacity of 1 GB, an area E1 has LBA of 000000h to 1FFFFFh, an area E2 has LBA of 200000h to 3FFFFFh, an area E3 has LBA of 400000h to 5FFFFFh, and area E4 has LBA of 600000h to 7FFFFFh.

Figure 7:
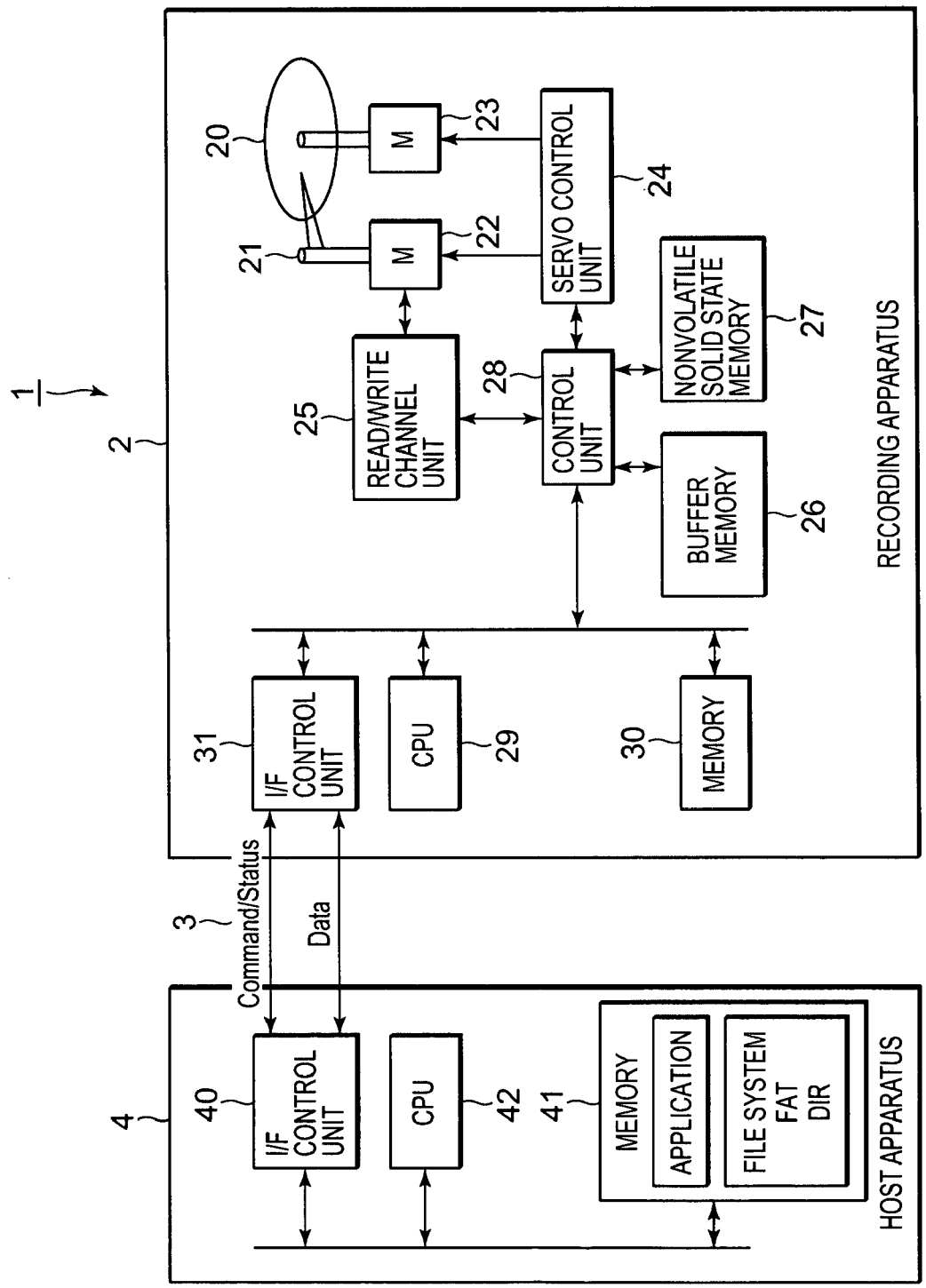
FIG. 7 is a diagram for explaining data writing when a host apparatus has a directory decision right and a FAT decision right.

FIG. 7 illustrates an example in which the recording apparatus 2 is used as an apparatus of a usual FAT file system in a PC environment. If PC is used as a host apparatus 4, the contents of FAT information and directory information are read from the system area of a recording apparatus 2 and developed in a memory 41 which a CPU 42 of the host apparatus 4 can access directly. The host apparatus 4 performs maintenance of the directory information and FAT developed in the memory, and at the same time reflects the maintenance contents upon the system area and directory area of the recording apparatus 2, each time the host apparatus 4 generates, deletes or modifies a file for its own duty.

Figure 8:
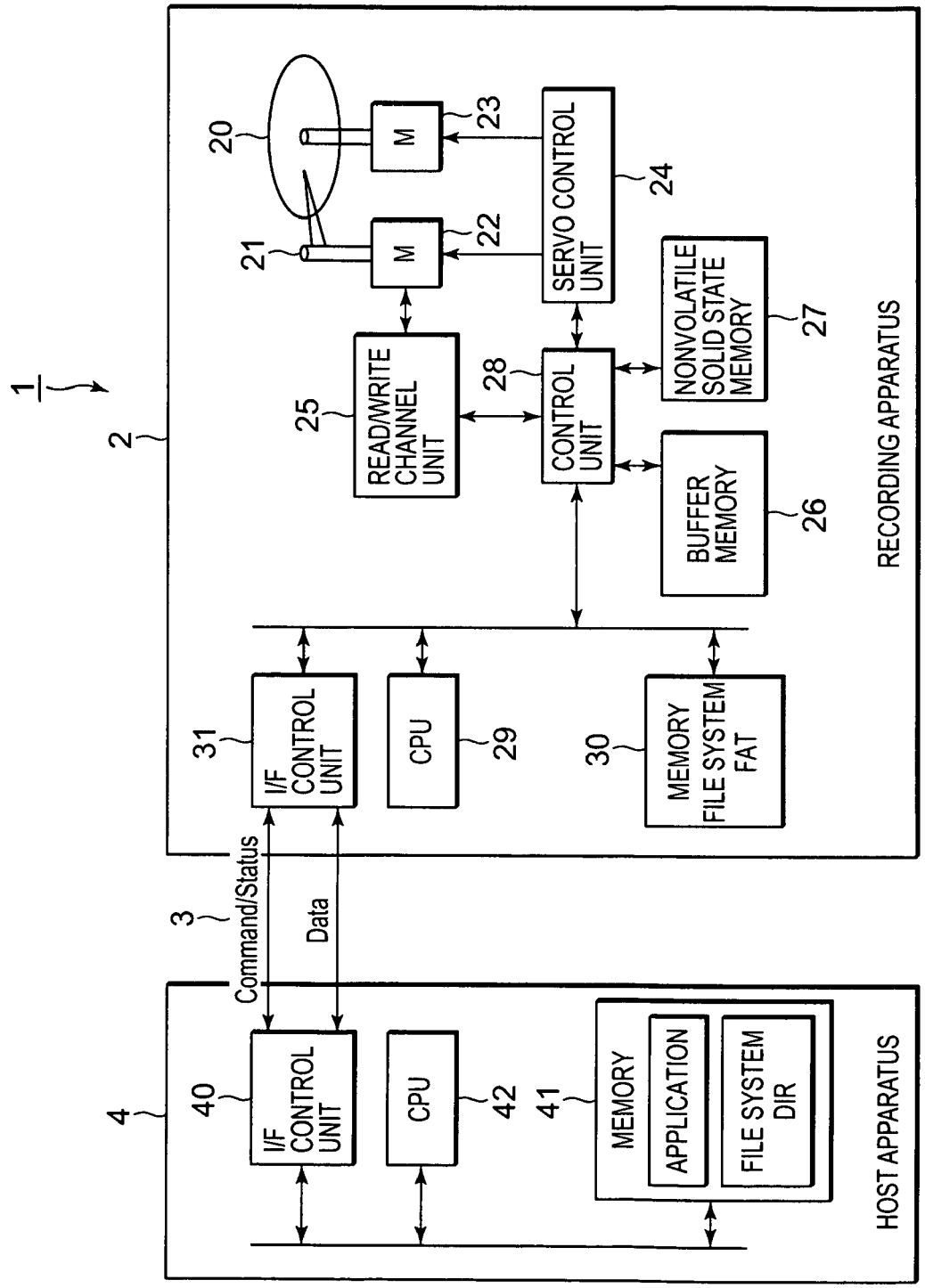
FIG. 8 is a diagram for explaining data writing when a host apparatus has a directory decision right and a recording apparatus has a FAT decision right.

According to the embodiment of the present invention, in order to effectively use the data area of the recording apparatus 2, search for a record empty area (empty cluster) and a FAT decision right are entrusted not to the host apparatus 4 side but to the storage side, recording apparatus 2 in this case, as shown in FIG. 8. This arrangement allows the system to be configured efficiently.

FIG. 8 illustrates an example in which a directory decision right is entrusted to the host apparatus 4 and the FAT decision right is entrusted to the recording apparatus 2. Therefore, the recording apparatus 2 itself decides a usable empty area (empty cluster) in the data area and a FAT chain, which is link information between clusters constituting one file. The host apparatus 4 designates only the start point, which is a top cluster number, of the FAT chain, and the following empty clusters are designated by the recording apparatus 2 itself.

Figure 9:
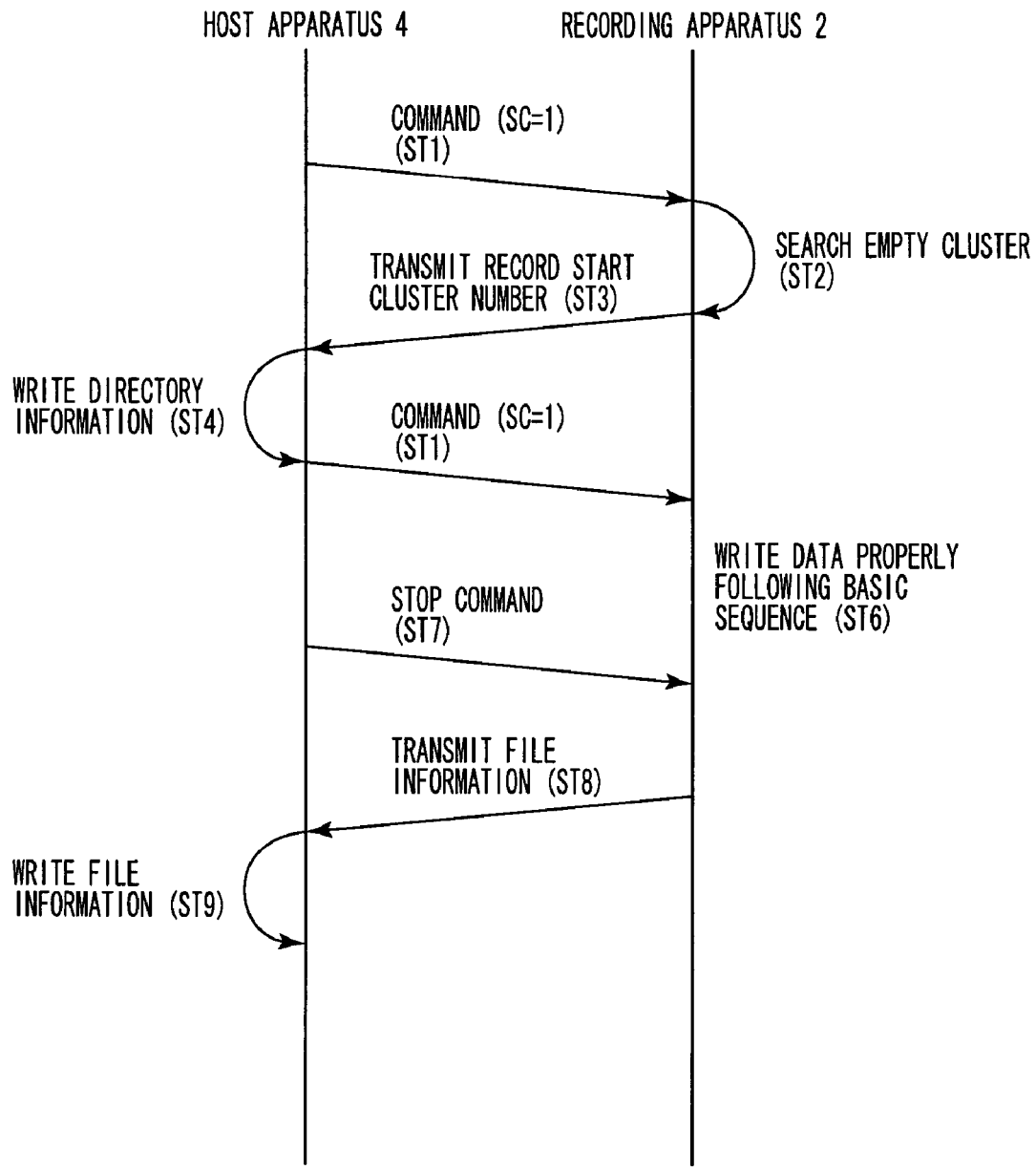
FIG. 9 is a time chart for explaining an operation of the data transmission/reception system at the time of executing a data write process.

With reference to the time chart shown in FIG. 9, a data write process of the data transmission/reception system 1 will be described. The data transmission/reception system 1 adopts as a file physical layout method a method (hereinafter called a head scheduling method) using a slow transfer rate area, which is a recording medium inner circumferential side, and a fast transfer rate area, which is a recording medium outer circumferential side, in combination, in order to guarantee the shortest seek time. It is assumed that a sequence of area E1→area E2→area E3→area E4→area E3→area E2→area E1 is set to the control unit 28, as the basic sequence for performing the head scheduling method. While data is written, the control unit 28 accesses areas by sequentially repeating the basic sequence. It is assumed that when data is written in an empty cluster of area E2 and then data is written in an empty cluster in area E1 in accordance with the basic sequence, the control unit 28 executes a process of temporarily storing file information on the data written in clusters in accordance with the basic sequence. It is also assumed that directory information is developed, that is, written in the memory 41 of the host apparatus 4 and FAT information is written in the memory 30 of the recording apparatus 2.

Figure 10:
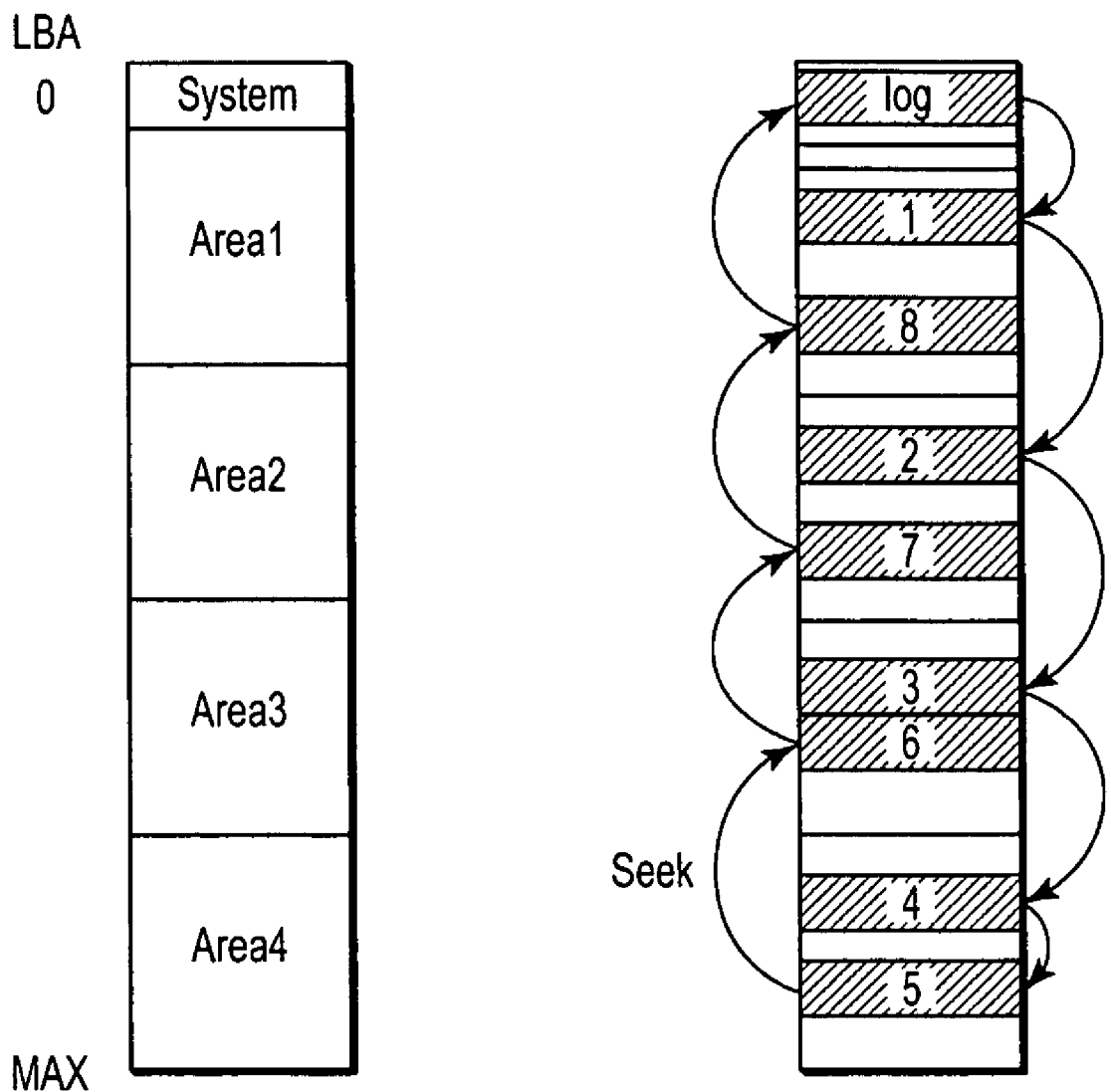
FIG. 10 is a diagram showing a relation between a basic sequence and a data protection process.
Figure 13:
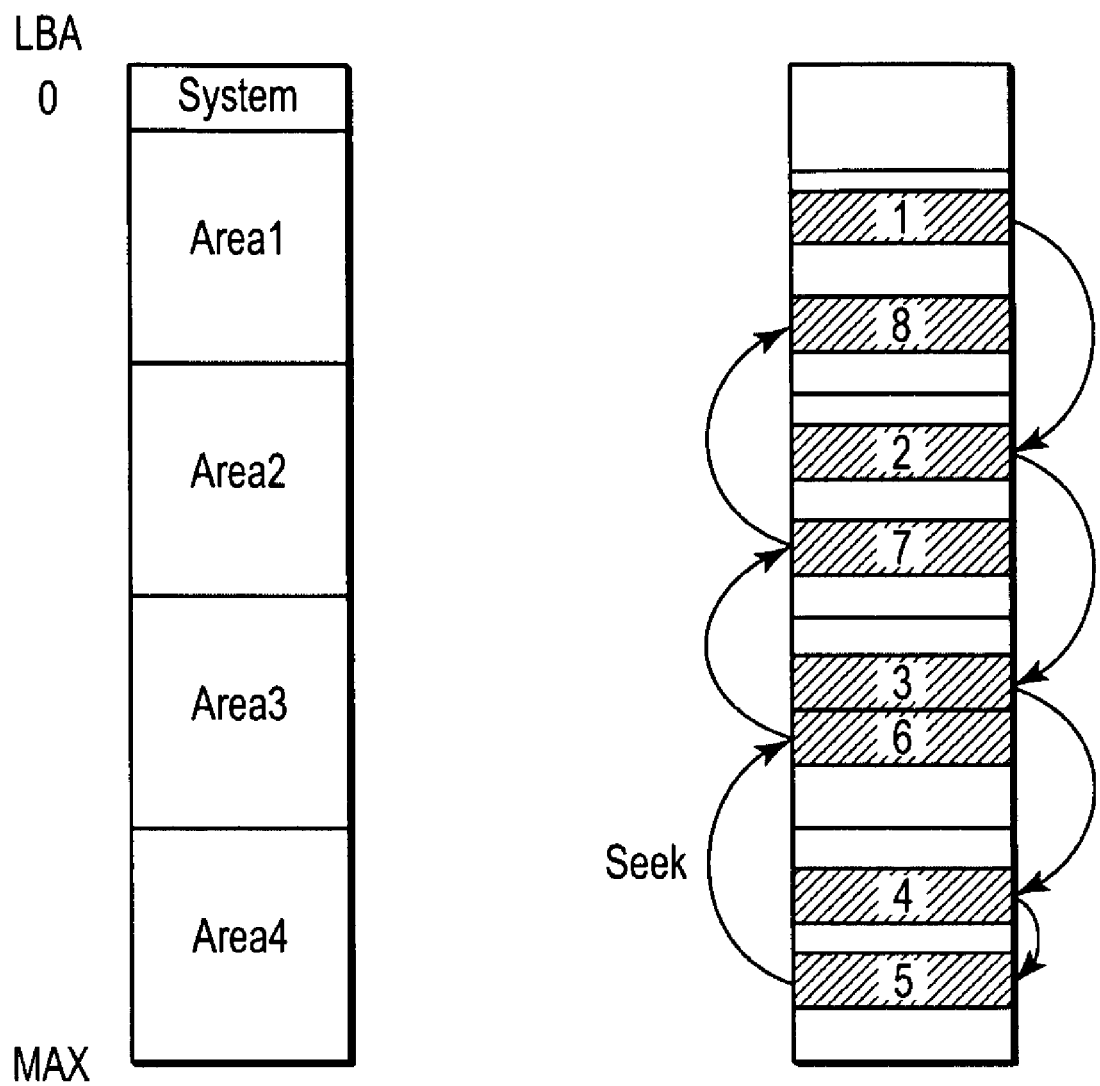
FIG. 13 is a diagram showing an example of a head scheduling process.

The present invention prevents a data transfer rate from being lowered, by updating FAT information at each basic sequence of the head scheduling method and properly setting an update timing of file information such as FAT information. It is assumed that updating the file information is performed when the data write area comes nearest to the file information write area. In this embodiment, a file information updating work as a data protection process is executed when data writing for the last area E1 of the basic sequence is completed (FIG. 10). The file information to be updated includes FAT information, directory information such as a file size, file recovery log information and the like.

The host apparatus 4 issues a command (SC=1) not accompanying a write process, to the recording apparatus (FIG. 11) (Step ST1). The recording apparatus 2 searches an empty cluster from clusters in the area E1, by using the FAT information written in the memory 30 (Step ST2), generates a predetermined command by using the searched empty cluster number and a record start cluster number (FIG. 12), and notifies the generated command to the host apparatus 4 (Step ST3). The record start cluster number becomes a file start cluster number.

A command shown in FIG. 11 is a Rec command. If "SC" is "1", the recording apparatus 4 searches an empty cluster without performing a write process for actual data, whereas if "SC" is "0", the recording apparatus searches an empty cluster, writes data in the searched empty cluster, returns a top number of the record start cluster number as a return value, and after write completion, searches an empty cluster from the next zone. In addition, "1" of "EOF" means that write data is the last cluster, and "0" of "EOF" means usual data writing. "Zone" indicates the number of divisions of one data zone.

A command shown in FIG. 12 is a status code which writes information representative of a record start cluster number.

In accordance with the record start cluster number obtained at Step ST3, the host apparatus 4 generates directory information on the file to be generated (Step ST4). The host apparatus 4 issues a data write command (SC=0) to the recording apparatus 2 (Step ST5), and transmits data corresponding to the first super cluster of the file to the recording apparatus 2. If the file size is large, the host apparatus divides the file into a plurality of data of the super cluster size, and transmits each data to the recording apparatus 2 to be written in a plurality of clusters.

The recording apparatus 2 writes the data transmitted from the host apparatus 4 in an empty cluster of the area E1 as the first super cluster. The recording apparatus 2 writes first data transmitted from the host apparatus 4 in the cluster corresponding to the record start cluster number transmitted to the host apparatus 4 at Step ST3, thereafter searches an empty cluster in each area in accordance with the basic sequence, and sequentially writes data in the searched empty cluster (Step ST6). Each time one basic sequence is completed, the recording apparatus 2 updates the file information on data written in each cluster. In this embodiment, although the area where the file information is written is assumed to be the outermost circumferential area of the recording medium 20, the file information may be written in the nonvolatile solid state memory 26.

When there is no data to be written, the host apparatus 4 transmits a stop command and requests for the file information (Step ST7). In response to the transmitted stop command, the recording apparatus 2 terminates the data write process and transmits the file information to the host apparatus 4 (Step ST8). The host apparatus 4 updates the file information transmitted from the recording apparatus 2, and transmits the updated file information (FAT, directory information) to the recording apparatus 4 (Step ST9). The recording apparatus 4 writes the file information transmitted from the host apparatus 2 in the area at a predetermined write position.

The data transmission/reception system 1 constructed as above is constituted of the recording apparatus 2 and the host apparatus 4 interconnected by the predetermined interface 3. In a case where data obtained by the host apparatus through photographing or the like is written in the recording apparatus 2, this data writing is performed in the mode that the host apparatus 4 has the directory decision right and the recording apparatus 2 has the FAT decision right. The recording apparatus performs data writing in accordance with the basic sequence for the head scheduling method, and updates the file information each time one basic sequence is performed. It is therefore possible to minimize a head seek process frequently executed in the related art as a power shutdown countermeasure process and to execute a data protection process without rupturing the data transfer rate by the scheduling method. The area in charge of the end of the basic sequence is set near to the area where the file information is written.

According to the embodiment of the present invention, the maximum data loss, for example, when a power shutdown or the like occurs during data writing, can be suppressed to the data corresponding to one basic sequence, several seconds for video data, for example. It is possible to avoid a loss of long time data, for example, that of 30 minutes or 1 hour, to be caused if the data protection process is not executed. It is also possible to prevent a data transfer rate from being lowered by executing the data protection process each time data is written in one cluster.

Further, according to the embodiment of the present invention, even in a case where the initial regular layout of data is destroyed by a data edition work after data writing and empty areas have a fragmented state, the performance of the present invention is hardly influenced.

Furthermore, according to the embodiment of the present invention, since the file system is managed by the recording apparatus 2, the recording apparatus 2 can execute an empty area (empty cluster) search process, a file protection process and the like, a processing capacity of the CPU 42 of the host apparatus 4 and a load of the memory 41 can be reduced, and cost for application development can be reduced.

In the embodiment of the present invention, although data writing is performed while the scheduling method and data protection process are executed, as for the basic sequence, a frequency of the data protection process and a write area of the file protection information are not limited to the above-described embodiment, but it is obvious that various modifications are possible without departing from the main features of the present invention.

Although HDD is used as a specific example of the storage device using a rotary recording medium, similar processes to those described above can be performed by a randomly accessible storage device, e.g., an optical disc such as CD and DVD. In the above description, although the FAT file system is used, any other systems may also be used if the systems manage data as a file.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
a recording medium having a data area with an address assigned to each cluster of a predetermined size;
an interface unit for connection to a host apparatus;
writing means for writing data supplied from said host apparatus via said interface unit in the data area of said recording medium;
access order deciding means for dividing the data area of said recording medium into a plurality of areas each having an optional data capacity, and when data is to be written, deciding an order of accessing the plurality of divided areas from said writing means;
timing deciding means for deciding a timing when file information on written data is to be updated, in accordance with the access order decided by said access order deciding means;
control means for controlling said writing means when data supplied from the host apparatus via said interface unit is to be written in the data area of said recording medium, to access a plurality of divided areas in accordance with the access order decided by said access order deciding means, to search an empty cluster in the accessed area, and to write data in the searched empty cluster; and
file information updating means for updating the file information on already written data in accordance with the timing decided by said timing deciding means.

2. The recording apparatus according to claim 1, wherein:
said recording medium has a file information area where the file information is to be written, and
said file information updating means writes the file information on the already written data in said file information area, at the timing decided by said timing deciding means.

3. The recording apparatus according to claim 2, wherein:
when an area of the plurality of divided areas in which area data is written in accordance with the access order decided by said access order deciding means becomes an area adjacent or near to said file information area, said timing deciding means decides the timing in such a manner that the file information on the already written data is updated after data is written in the area adjacent or near to said file information area.

4. The recording apparatus according to claim 1, further comprising:
a nonvolatile storage medium having a data area constituted of a plurality of areas each having a predetermined size, wherein:
said file information updating means writes the file information of the already written data in an optional area of said nonvolatile storage medium at the timing decided by said timing deciding means.

5. A recording apparatus comprising:
a recording medium having a data area with an address assigned to each cluster of a predetermined size;
an interface for connection to a host apparatus;
a writing unit for writing data supplied from said host apparatus via said interface in the data area of said recording medium;
an access order deciding unit for dividing the data area of said recording medium into a plurality of areas each having an optional data capacity, and when data is to be written, deciding an order of accessing the plurality of divided areas from said writing unit;
a timing deciding unit for deciding a timing when file information on written data is to be updated, in accordance with the access order decided by said access order deciding unit;
a controller for controlling said writing unit when data supplied from the host apparatus via said interface is to be written in the data area of said recording medium, to access a plurality of divided areas in accordance with the access order decided by said access order deciding unit, to search an empty cluster in the accessed area, and to write data in the searched empty cluster; and
a file information updating unit for updating the file information on already written data in accordance with the timing decided by said timing deciding unit.

* * * * *